Nov. 28, 1961   E. E. JENNINGS   3,010,728
PIPE REINFORCING SUPPORT
Filed Oct. 11, 1960   4 Sheets-Sheet 1

INVENTOR.
Edward E. Jennings,
BY John R. Leonard,
his ATTORNEY.

Nov. 28, 1961      E. E. JENNINGS      3,010,728
PIPE REINFORCING SUPPORT

Filed Oct. 11, 1960      4 Sheets-Sheet 2

INVENTOR.
Edward E. Jennings,
BY John H. Leonard,
his ATTORNEY.

INVENTOR.
Edward E. Jennings,
BY
his ATTORNEY.

United States Patent Office 3,010,728
Patented Nov. 28, 1961

3,010,728
PIPE REINFORCING SUPPORT
Edward E. Jennings, Cleveland, Ohio, assignor to The Pipe Machinery Company, Wickliffe, Ohio, a corporation of Ohio
Filed Oct. 11, 1960, Ser. No. 61,871
14 Claims. (Cl. 279—2)

This invention relates to a pipe reinforcing support, and particularly to a support for reinforcing and supporting the wall of pipe against radial collapse under the pressure of a radially applied tool during machining operations, such as threading, cutting, and the like. The support is useful also in connection with the holding and steadying of the end portion of a pipe during, and upon completion of, cropping operations.

Most specifically the invention relates to a supporting body adapted to be placed in coaxial telescopic radially spaced relation to a pipe and having a plurality of fingers which are movable generally inwardly and outwardly of the body into reinforcing and supporting relation to the pipe wall. The fingers are driven toward the wall concurrently by a common driving means, and as each finger extends and engages the wall under light pressure, its driving connection is rendered inoperative, independently of the driving connections of the other fingers and independently of the distance the finger has been extended, so that all of the fingers are brought into equal light pressure contact with the pipe wall. The fingers are self-locking against return in the opposite direction and, therefore, buttress and reinforce the pipe wall so as to resist very large forces applied toward them against the opposite surface of the wall by the tool. Since the fingers are arranged to be driven so that each can move a different distance from the others, independently, if necessary, to engage the pipe wall, and each becomes released from the common driving means upon engagement with the wall, the fingers can properly engage a pipe wall which is out-of-round, each finger with the same preselected light pressure as the others.

Furthermore, the fingers are so arranged that all can be retracted from their respective extended positions to fully retracted positions by reversal of their common driving means regardless of the differences in the distance each has been extended.

The support is shown and described herein, for purposes of explanation, as received within a pipe for reinforcing of the wall of a pipe against radially inward collapse, regardless of the trueness or out-of-roundness of the pipe. However, it may be applied to the internal peripheral wall of an end portion of a pipe for supporting and steadying the end portion during cropping and for holding the end portion as it is severed. To this extent, the support can be used for the same purposes as the mechanism described in the co-pending application of John G. McKay, Serial No. 12,447, filed March 2, 1960, and entitled Mechanism for Steadying and Cropping the Ends of Elongated Stock.

By a reversal of parts, the reinforcing and supporting operation may be performed on a pipe received in the central bore of the body, by engaging the exterior wall surface of the pipe by the fingers, as in the foregoing co-pending application.

In performing machining operations on the exterior of a length of pipe, the inwardly directed applied pressure of the tool often is sufficient to cause elastic deformation of the pipe during the machining operation. This is particularly true in the case of high speed cutting or rolling of tapered threads with carbide chasers or roller dies. This elastic deformation is such that the threads are formed while the pipe is temporarily out-of-round. Hence, when the pipe returns to its original external cross section, the thread, if a straight thread, has a slight reverse taper, and, if a tapered thread, is found not to have the proper taper.

It is necessary, therefore, that the wall of the pipe be supported and reinforced internally against the applied pressure of the tool at closely spaced areas uniformly distributed over the interior of the wall at the zone of application of the tool. While thus supporting and reinforcing the wall internally against large forces, it is necessary that the pressure applied to any engaged wall area by the support itself be insufficient to elastically or permanently distort the pipe wall.

Furthermore, the present threading machines, using carbide chasers, operate at such extremely high speeds that the time required for the actual threading operation is very short, being only a few seconds. As threading time is reduced, the few seconds of time required for inserting, operating, and withdrawing a support become a progressively disproportionate amount of the overall machining time required for each pipe.

Accordingly, for pipes which are to be internally supported, the support must be capable of rapid insertion into the pipe, the fingers must be quickly extendable into proper supporting relation to the pipe wall and as quickly retractable therefrom, and the support must be removable rapidly from the pipe.

One of the principal objects of the present invention is to provide a simple and rugged pipe reinforcing support which is readily operatively associable with lengths of pipe, successively, readily expandable into supporting relation thereto and retractable therefrom, and rapidly disassociable therefrom, and which is effective to support the pipe wall against distortion even by high applied tool pressures, without itself imposing on the pipe wall any pressure capable of distorting the wall elastically or permanently.

A more specific object is to provide an internal support in which a plurality of radial fingers are carried and are driven outwardly into supporting relation against the wall of the pipe by a common drive, and in which the fingers are connected in such a manner that each finger can travel outwardly, independently of the others, whatever distance is required to engage the wall of the pipe, and then seat against the pipe wall with a predetermined light pressure which is the same essentially for all fingers, in which each finger is self-locking against return in the opposite direction by pressure applied directly radially inwardly of the pipe or other than by a common driving means, and in which each finger, when retracted by the common driving means, is retracted to its original starting position wherein the outer ends of the fingers are substantially flush with the surface of the body regardless of the extent to which the finger may have been extended.

A more specific object is to connect the fingers to a common rotatable driving means with self releasing clutches which are respective to the fingers and each of which releases to protect its finger from excessive strains, imposed by the driving means, which might damage the device, and which also releases the drive of the fingers in the extending direction when the pressure with which the fingers engage the internal wall of the pipe has reached a predetermined light maximum pressure permitted.

Other objects and advantages will become apparent from the folllowing description wherein reference is made to the drawings, in which.

Figures 1, 2:
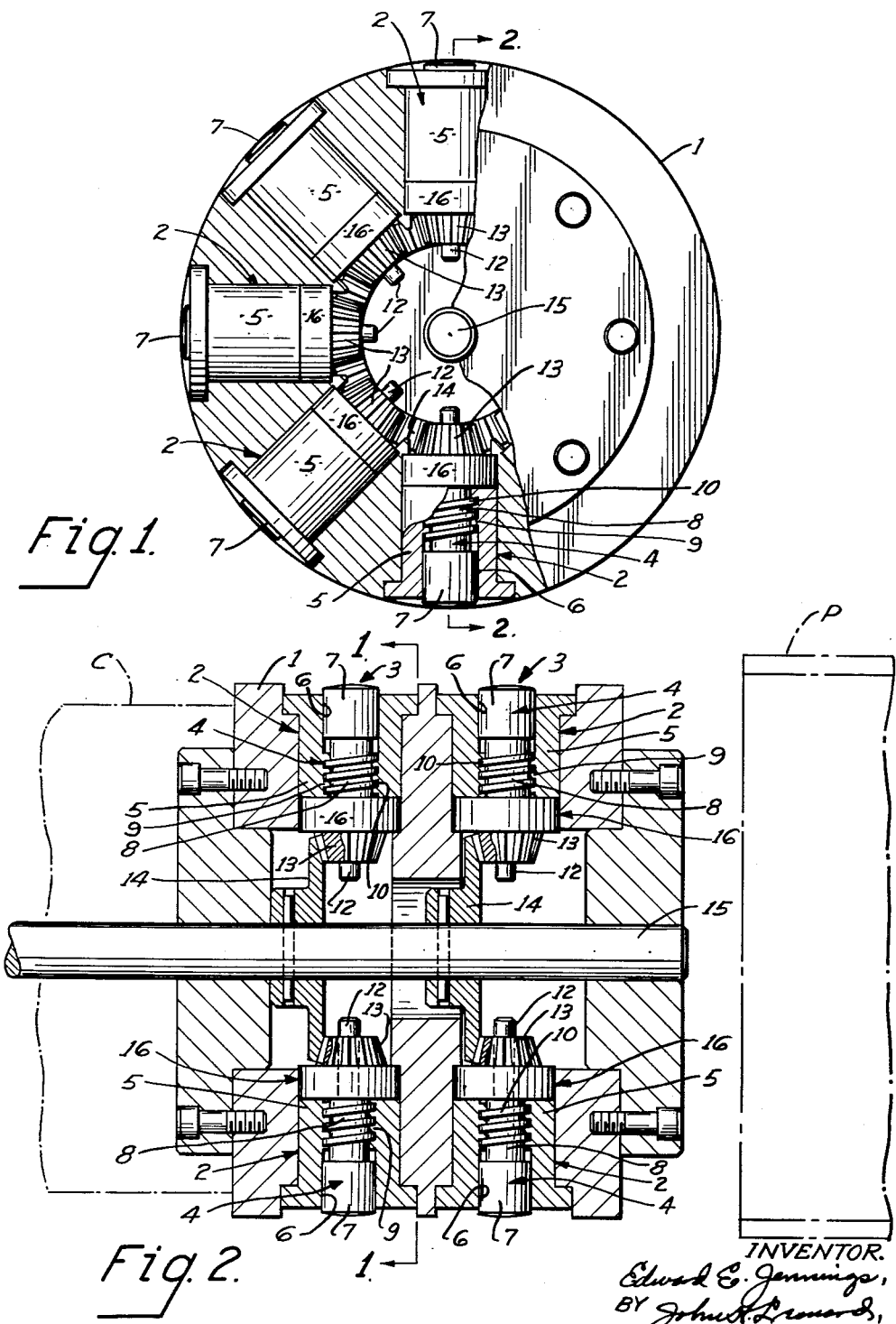
FIG. 1 is a front end elevation, partly in section, of a support embodying the principles of the present invention, part thereof being shown in section, as taken on line 1—1 of FIG. 2.
FIG. 2 is an axial vertical sectional view of the device illustrated in FIG. 1 and is taken on line 2—2 thereof.
Figure 3:
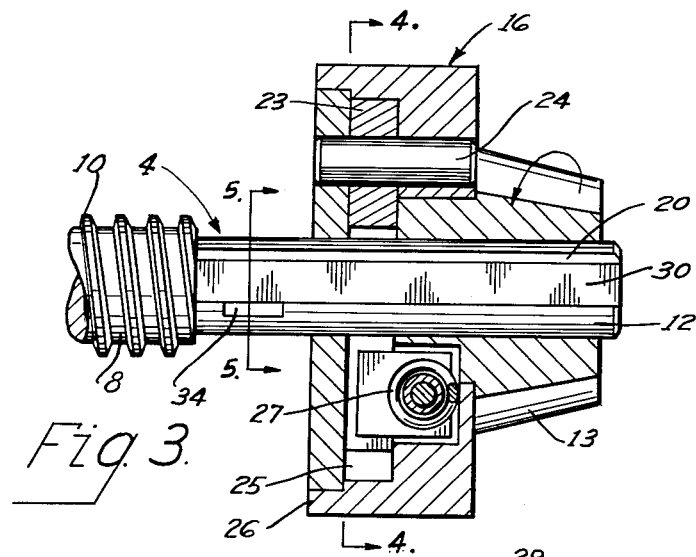
FIG. 3 is an enlarged fragmentary view of the device illustrated in FIG. 2, and showing the lower finger thereof and the operating mechanism therefor.

Referring to the drawings, the invention is described as applied specifically to one for supporting pipes interiorly for the purposes above mentioned. It is understood that the device itself may be supported on any suitable carriage so that it can be moved axially of the pipe into and out of the pipe in coaxial telescopic radially spaced relation to the pipe wall, the specific supporting means forming no part of the present invention.

A carriage, therefore, is indicated generally at C, and is shown as mounted on a suitable slideway so that it can move the support axially, in coaxial relation with a pipe P, for entering the support in the pipe.

The support itself comprises a body 1 which is supported by the carriage in fixed circumferential position relative to the pipe P. Mounted within the body 1 are several rows of pipe supporting and reinforcing units, designated generally at 2, the rows being arranged in spaced relation axially of the body 1 and the units 2 of each row being distributed circumferentially of the body 1. In the form illustrated, two rows 3 of eight units each are shown. Any number of units and rows may be employed.

The units of one row may be offset circumferentially with the units of the next adjacent row or rows so as to obtain more nearly uniform distribution of the fingers over the wall surface. However, if desired, the fingers of one row may be aligned endwise of the body with the corresponding fingers of the adjacent rows.

Since the units 2 are identical in form and function, only one is described herein in detail. Each of the units 2 comprises a finger operating device, designated generally at 4 which includes a sleeve 5 having an axial bore 6 in which a finger 7 is mounted for reciprocation radially of the body to extended and retracted positions, respectively. In order to move the finger to these positions, suitable reversible driven devices are provided and arranged one for each finger. Each device, as shown in the preferred embodiment in FIGS. 1 and 2, includes a member 8 which may be formed integral and coaxial with the finger 7. The member 8 and the sleeve 5 have coacting worm and follower means, a suitable form being provided by internal threads 9 in the sleeve 5 and external threads 10 on the member 8. Thus the member 8, upon rotation in opposite directions relative to the sleeve 5, is caused to move outwardly and inwardly radially of the body 1 and thus move the finger 7 to extended and retracted positions.

In order so to rotate the member 8 in opposite directions, it is provided with a fixed shank 12 which is received in, movable axially of, and rotatable relative to, a suitable driving member 13, in the form of a bevel gear. The member 13, in turn, is connected to a complementary gear 14 of a common driving means. The gears 13 of all units 2 of the same row are driven by a common gear 14. Likewise the gears 14 for the individual rows are driven by a common shaft 15. The shaft 15 can be rotatably driven, in opposite directions, selectively, by any suitable manual or power means.

For example, a hand crank may be applied to the shaft 15 or it may be driven by a suitable motor inasmuch as there is no danger of over-stressing the driven parts due to the release mechanisms hereinafter described. Thus not only are all of the units 2 of one row driven by a common driving means, but all of the rows are driven by the same common driving means. Any number of such rows and units per row may be provided.

In order to drive the member 8, and thereby the finger 7, to extended and retracted positions by the member 9, a suitable slip clutch, designated generally at 16, is drivingly interposed between the members 8 and 13.

The slip clutch 16 is normally operable to cause the finger operating device 4 to be driven by the common driving means so as to extend and retract the finger 7. This is accomplished, in the form illustrated, by interposing the slip clutch 16 between the member 13 and the rigid shank 12 of the member 8. The slip clutch 16 provides a driving connection between the members such that the shank 12 can move axially of the member 13 while rotatably driven thereby through the slip clutch 16 connection. The slip clutch 16 may be of such design as is desirable for effecting this particular connection.

Figure 4:
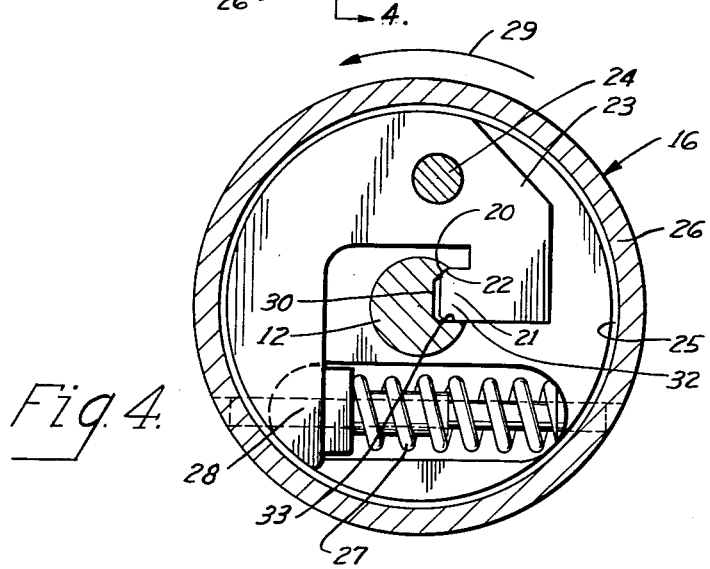
FIG. 4 is an enlarged cross sectional view taken on the line 4—4 of FIG. 3.
Figure 5:
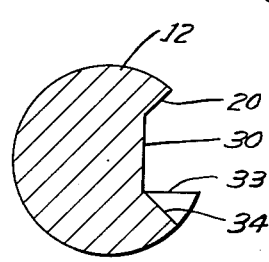
FIG. 5 is an enlarged fragmentary cross sectional view taken on the line 5—5 in FIG. 3.

For example, it may comprise a driving shoulder 20 on, and extending longitudinally of, the shank 12, and a detent 21 having a shoulder 22 complementary to and engageable with the shoulder 20 for rotation therewith and movement therealong concurrently. The detent 21 is mounted on one end of a rocker 23 which is pivotally connected by a pivot 24 in a large diameter counter-bore 25 in a housing 26 rigid with the member 13. The pivot supports the rocker 23 for rocking about an axis parallel to the rotational axis of the member 13 and shank 12. A suitable spring 27 is operatively interposed between the other end 28 of the rocker 23 and the wall of the peripheral wall of the counter-bore 25 and normally urges the rocker to rock in a direction about its pivot to cause the shoulder 22 of the detent to engage the shoulder 20 of the shank and connect the member 13 and the shank 12 for rotation together in the direction indicated by the arrow 29 in FIG. 4, this direction being that which drives the finger 7 to extended position.

The shoulder 20 may be provided by cutting a suitable radially outwardly open groove 30 in the shank 12, the groove 30 extending longitudinally of the shank and parallel to the axis of rotation of the shank. The shoulder 20 and complementary shoulder 22 slope outwardly in the direction of rotation and thereby provide a releasable connection. This connection is such that, in event a torque resisting rotation of the shank 12 in the finger extending direction is imposed on the shank and becomes greater than that desired for applying the finger to the internal wall of a pipe at a predetermined pressure, the surface 22 cams the detent outwardly from the shank and out of the groove 30 so that the shoulders 20 and 22 disengage and release the driving connection. This movement of the detent 22 is by rocking the rocker 23 against the resistance of the spring 27. By the choice of the slope of the shoulders 20 and 22 and the strength of the spring 27, the driving connection between the member 13 and the member 8, through the shank 12, can be preselected to release at the resisting torque desired. When the finger 7 engages the pipe very lightly it is constrained from further movement radially outwardly. This causes the threads 9 and 10 to bind slightly so that a slight moment is imposed on the member 8 by the sleeve 5 and resists rotation of the member 8. This imposes initially a slight moment resisting rotation of the shank 12 by the member 13. This slight resisting moment causes a disconnection of the slip clutch 16, breaking the driving relation from the common driving means to the finger. This moment is so light that no appreciable outward stress, sufficient to elastically distort the pipe, is imposed on the pipe by the finger. On the other hand, due to the pitch of the threads 9 and 10, the member 8 is self locking against axial movement in a return or retracting direction from any extended position.

As the result of this arrangement, as each finger is driven outwardly and strikes the pipe, it is prevented from further movement in the extending direction, but stops with light contact with the pipe and thereby breaks its driving connection. At the same time, each finger is self locking against movement in the retracting direction by opposing inwardly directed heavy radial forces applied by the tool on the exterior of the wall of the pipe. Hence the pipe is well supported and reinforced against radial collapse while held free from elastic deformation by the fingers.

On the other hand, when the fingers are to be retracted by the common driving means, it is desirable that all of the fingers be retracted to the starting position regardless of how far they may have been extended, and regardless of whether each was extended the same distance or a different distance from the others. In order to retract the fingers to their starting position, the detent 21 is provided with a shoulder 32 and the opposite wall of the groove 30 provides a complementary longitudinal shoulder 33. These shoulders interconnect the member 13 and shank 12 for rotation in the finger retracting direction. Preferably they are very abrupt with respect to each other, although they may, if desired, be sloped so that they release as did the shoulders 20 and 22. When they are made abrupt, as illustrated, then the detent cannot be cammed out of driving relation in the retracting direction. Hence, at a preselected location on the shank, the shoulder 32 may be practically cut away or greatly relieved, so as to provide an escape flat, indicated at 34, over which the detent can ride. The flat 34 is so positioned endwise of the shank that when the shank returns inwardly radially of the body to fully retracted position, the flat is aligned circumferentially of the shank with the detent 21, and the detent can ride out of the groove to release, and continue to enter and leave the groove regardless of the number of rotations of the member 13.

The slip clutches are thus effective to cause the common driving means 15, including its gears 14, to be effective for driving the members 13 to extend and retract the fingers 7.

In the form illustrated in FIGS. 1 through 5, this driving relation is effected by causing the normally inter-engaged detent 21 and shank 12 of the member 8 to rotate the member 8 in the sleeve 5 which is stationary in the body 1. Thus the drive is by effecting relative rotation between the member 8 and the sleeve 5.

Figure 6:
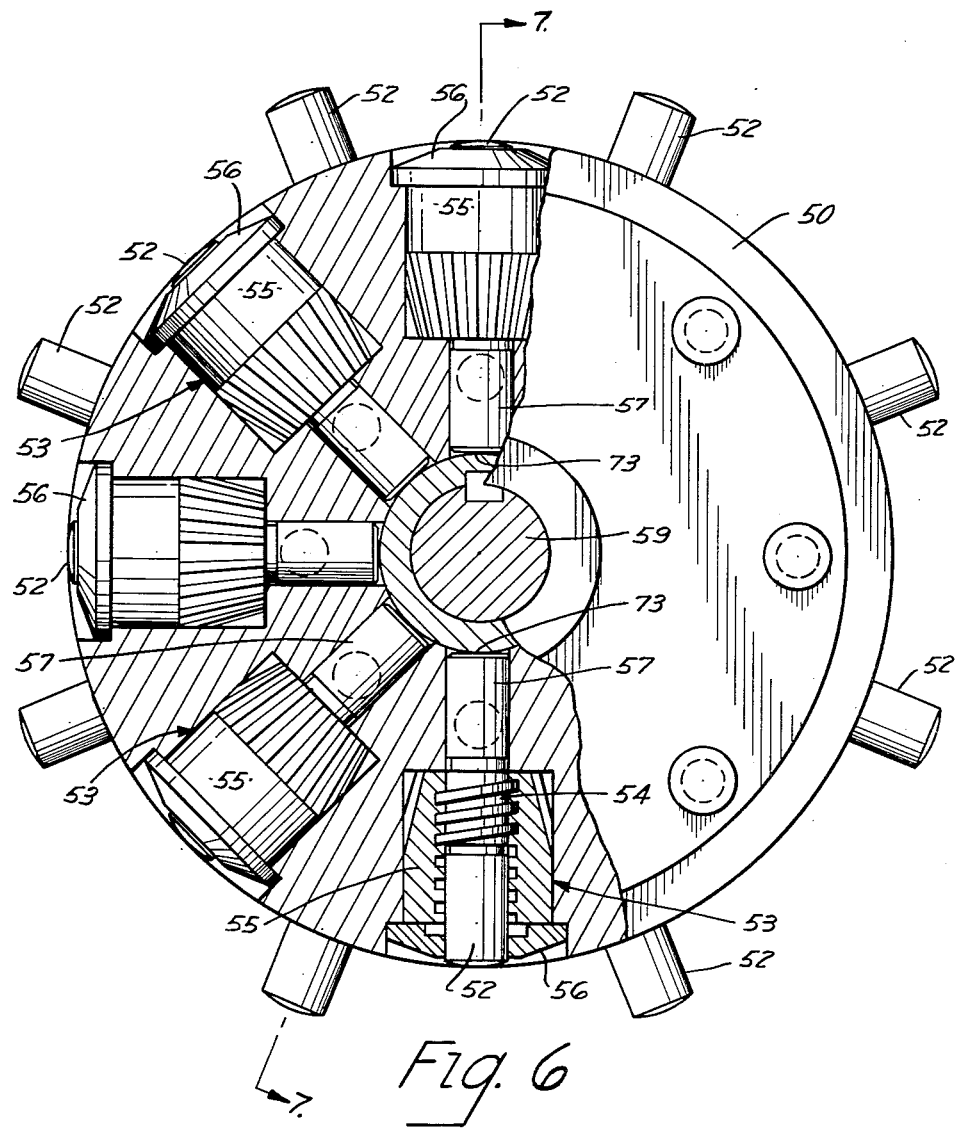
FIG. 6 is an end elevation, similar to FIG. 1, illustrating a modified form of the invention, part thereof being shown in section as indicated by the line 6—6 in FIG. 7.
Figures 7, 8:
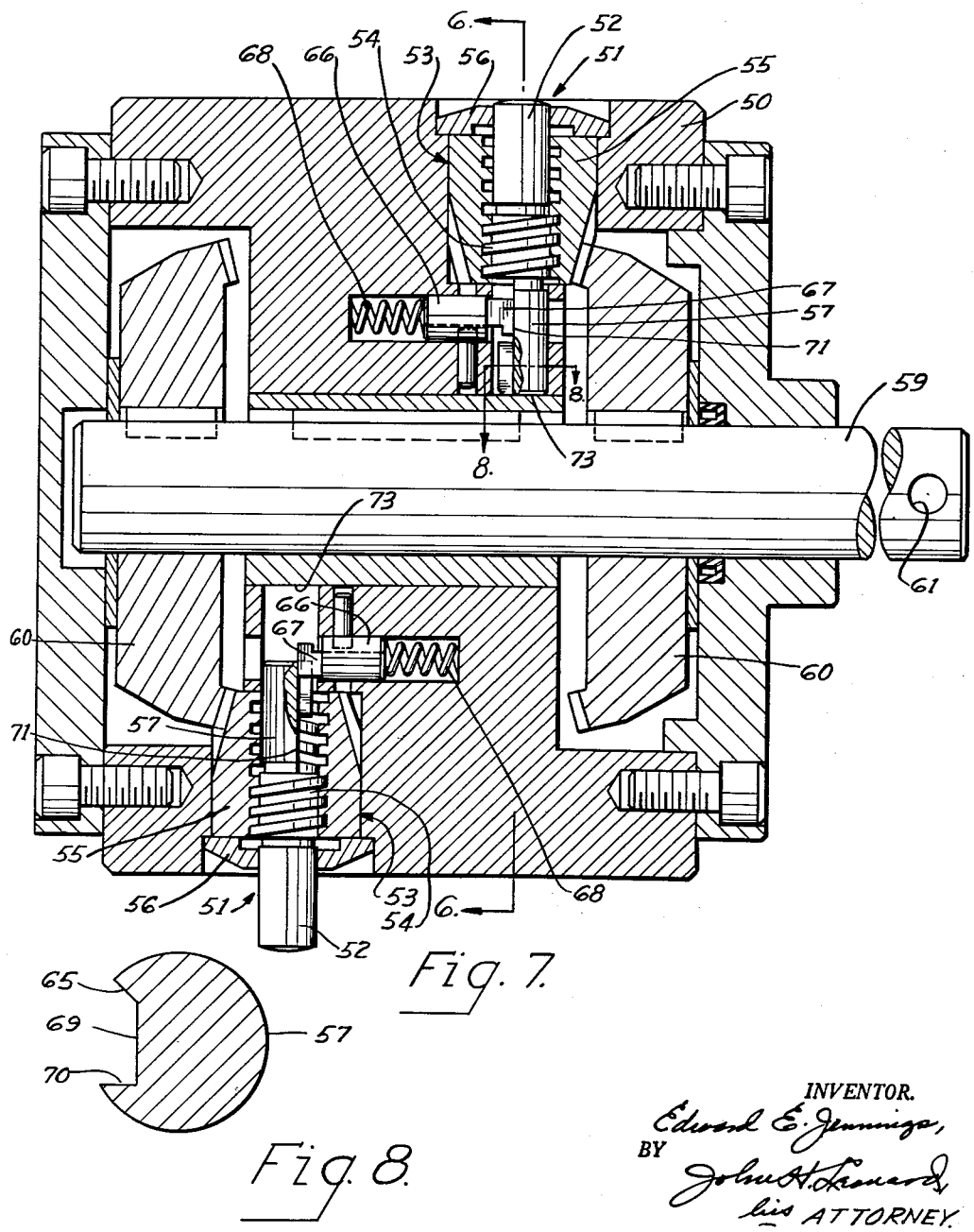
FIG. 7 is a vertical longitudinal sectional view through the axis of the support illustrated in FIG. 6, and is taken on line 7—7 thereof; and, FIG. 8 is an enlarged fragmentary sectional view of part of the structure illustrated in FIG. 7, and is taken on the line 8—8 in FIG. 7.

In the modified form, now to be described, a corresponding drive is effected by providing a sleeve which is rotatable in the body and employing a slip clutch which normally is disengaged from the shank so as to allow the sleeve and relatively rotatable member to rotate together. Engagement of the slip clutch with the shank holds the member in fixed position about its axis so that it becomes rotated relative to the rotating sleeve in the body. This modified form of the device is illustrated in FIGS. 6 through 8, and comprises a body 50 having a plurality of rows of radial units 51, the units of each row being spaced from each other circumferentially of the body in the same general manner as the units 2 hereinbefore described. Since the units 51 are the same in form and function, only one will be described in detail.

Each unit 51 comprises a finger 52 for engagement with the pipe. The operating device, indicated generally at 53, for each finger comprises a member 54 which preferably is both rotatable with, and integral with, the finger 52, and which is in threaded engagement with the sleeve 55. Accordingly, when the device or member 54 and sleeve 55 are rotated relative to each other in opposite directions, the finger 52 is driven axially of the sleeve 55 to extended and retracted positions, respectively. The sleeve 55 is mounted for rotation in opposite directions about its axis in a suitable radial bore in the body 50 and is held secured in axial position in the bore by a cap 56. The member 54 has a coaxial integral shank 57 which is rotatable therewith and extends beyond the inner end of the sleeve 55 inwardly of the body. Mounted within the body is a rotatable shaft 59 on which are mounted, for rotation therewith, a plurality of gears 60. Each gear 60 is drivingly connected to the sleeves 55 of one circumferential row of units for rotating the associated sleeves in opposite directions about their respective axes consequent upon rotation of the shaft 59 in opposite directions about its axis. This rotation may be effected by a suitable detachable pin inserted in the bore 61 of the shaft 59, or by connecting the shaft to any suitable reversible motor or power means, as desired. Thus, by rotating the shaft 59 in opposite directions, each sleeve 55 is caused to rotate in opposite directions. Normally the member 54 rotates with its sleeve, due to the frictional engagement of the threads therewith. Consequently the finger 52 is neither advanced nor retracted. When it is desired to advance or retract the finger 52, however, it is only necessary to cause the common driving means to effect relative rotation between the member 54 and the sleeve 55. This is done by engaging the shank 57 and restraining it from rotation about its axis relative to the body 50. By thus restraining the shank 57 from rotation about its axis relative to the body while the sleeve 55 is being driven by the gear 60, the member 54 and the sleeve 55 are caused to rotate relative to each other. Thereupon, the member 54 is advanced or retracted by the screw connection, depending upon the direction of rotation of the sleeve 55.

For thus rendering the common drive means effective to advance or retract the finger 52, the shank is connected by a slip clutch connection to the body and this connection renders the member 54 rotatable relative to the sleeve 55 when the sleeve is being rotated relative to the body. The slip clutch connection includes a longitudinal shoulder 65, corresponding in operating effect to the shoulder 20 heretofore described on the shank. A detent 66 is mounted in the body for movement radially of the shank into and out of engagement behind the shoulder 65. The detent has an operative shoulder 67 corresponding to the shoulder 22 and engageable with the shoulder 65 so as to restrain the shank 57 from rotation relative to the body. A spring 68 is interposed between the detent and a wall portion of the body 50 so as to urge the detent into seating position behind the shoulder 65. The shoulders 65 and 66 cooperate to cam the detent out of engagement with the shoulder 65 and thus release the shank consequent upon the pin engaging the interior wall of the pipe and being prevented, therefore, from further axial travel. When the pin is thus restrained from axial travel, a turning moment is applied to it by the sleeve 55 and this moment is sufficient to unseat the detent 66 and release the shank from the body so that the member 57 and sleeve 55 can rotate together as a unit.

The shoulder 65 is provided by forming a longitudinal groove 69 in the shank 57, this groove opening radially of the shank and having at the opposite side a shoulder 70 which is more abruptly disposed with respect to the engaged surface or shoulder 67 of the detent 66 so that it locks the shank and detent together to cause relative rotation of the members 57 and 55 in a direction for retracting the finger 52.

In order to stop the finger at the proper retracted position, the shoulder 70 has a cutout portion or flat 71 which is sloped at a relatively flat angle in much the same manner as the flat 34. The flat 71 is positioned axially of the shank so that when the finger is fully retracted, the shank is positioned inwardly so that the flat 71 is aligned circumferentially of the shank with the detent. Thus, in fully retracted position, the inner end of the shank can seat against the bottom 73 of its associated body bore. Seating of the shank against the bottom 73 prevents further inward movement of the shank by the member 54 due to the relative rotation between it and the sleeve. Since the shank can no longer move inwardly, it tends to bind and to be rotated by the sleeve 55. The turning moment thus applied to the shank is sufficient to cam the detent over the flat 71 and thereby release the shank so that the member 54 and the sleeve 55 can rotate together as a unit.

It is seen that with this arrangement substantially the same operation as disclosed in connection with FIGS. 1 through 5 is obtained.

Thus, in operation, assuming the shaft 59 is being driven in the direction to extend the fingers, it rotates the sleeves 55 continuously. Since the detents 66 are in operative engagement with their shanks 57, the detents constrain the shanks to relative rotation with respect to their sleeves 55. Because of this relative rotation, the members 54, and thereby tthe fingers 52, are moved in the extending direction. As soon as the fingers engage the pipe lightly and can no longer move axially in the extending direction, there is some binding in the threaded connection between the members 54 and the sleeves 55 tending to rotate the two together. This binding force is sufficient to produce turning moments on the shanks which, exerted against the detents 66, cam them outwardly and release the shanks so that each member 54 and its associated member 55 rotate together.

Thus the end of each finger is applied to the pipe under predetermined light pressure, depending upon the strength of its spring 67 and the slope of its associated shoulders 65 and 66.

Upon rotation of the common drive means in the opposite direction, each sleeve and member 54 tend to rotate together until the groove 69 is aligned with the detent and the detent engages therein. Upon the detent engaging the groove, it rests against the shoulder 70 and therefore restrains the member 54 from rotation relative to the body. This renders the common drive means operative to cause relative rotation of the sleeve 55 and the member 54 in the direction for driving the member 54 in the retracting direction. This continues until the flat 71 on the shank 57 is aligned with the detent shoulder 67 and the inner end of the shank has engaged the bottom 73 of its bore. Thereupon, since tthe member 54 cannot move inwardly any farther, a turning moment is developed tending to rotate the member 54 and the sleeve 55 together in the retracting direction. Since the detent at this time is aligned with the flat 71, it disengages and allows the member 54 and the sleeve to rotate as a unit in the fully retracted position.

It is apparent from the foregoing description that the devices operate to reinforce the pipe against radial collapse or distortion by a tool and also can support an end of the pipe during the cropping operation so that the end cannot jam against the tool or fall and cause damage.

In any event, the fingers engage the wall of the pipe with very light pressure so as not to cause any distortion. Yet, they are self locking in the reverse direction because of the pitch of the screw threads and hence can resist very high forces applied in opposition to them by the tools. Further, each finger can operate in the extending direction independently of the others from the common drive means, so that each moves whatever distance is necessary to engage the pipe wall and thereafter maintains a light pressure contact with the wall until retracted. They can all be withdrawn to their respective original starting positions by reversing the common driving means. Furthermore, in case the pipe is out-of-round or is chucked in eccentric relation to the body, the fingers still will find their proper position for supporting the pipe and engage it with the same pressure regardless of the distance it is necessary for each to move in the extending direction to engage the pipe wall.

Having thus described my invention, I claim:

1. A pipe wall support including a body, a plurality of fingers mounted in the body with the axes extending generally radially of the body for movement in opposite directions generally radially of the body, a common reversible rotatable driving means for the fingers coaxial with, and rotatable relative to, the body, overload releasable clutch devices for its fingers, respectively, and interconnecting the driving means and fingers and operative to render the driving means effective to drive the fingers in said opposite directions when the driving means are rotated in opposite directions, respectively, and each device being releasable independently of the others upon predetermined maximum reaction moment applied to it by the driving means in the direction for moving the fingers in the extending directions.

2. A device according to claim 1 including additionally means to cause release of the devices from the fingers, independently of each other, each upon its associated finger being driven by said common driving means to a predetermined starting retracted position.

3. A pipe wall support comprising a body adapted to be disposed endwise in coaxial telescopic radially spaced relation to a pipe wall, a plurality of pipe engaging fingers, supporting means respective to the fingers and supporting them in the body for movement, transversely of the body, in an extending pipe engaging direction and in an opposite retracting direction, selectively, reversible driven devices for the fingers, respectively, each device including members relatively rotatable about a common axis and operable, when relatively rotated in opposite directions, to drive their associated fingers in said extending and retracting directions, respectively, at least one of said members being rotatable relative to the body about said common axis, a common rotatable reversible driving means mounted in the body, self-releasing clutch means respective to the devices, each self-releasing clutch means being normally operatively connected to said one of the members of its associated device and operative when so connected to render the common driving means operable to effect said relative rotation of the members of said associated device by the common driving means for driving the fingers in said extending and retracting directions, selectively, the self-releasing clutch means of each device being operative in response to a predetermined maximum reaction force imposed on it by one of the associated members when the common driving means is driving the fingers in the extending direction, to release itself from said one of its associated members, thereby to cause discontinuance of said relative rotation of the members.

4. The support according to claim 3 wherein said self releasing means of each device includes complementary clutch elements, one of the elements being connected to said one of its associated members, and resilient means yieldably urging the elements into clutching relation.

5. The device according to claim 4 wherein the other clutch element is movably mounted on the other of its associated members and, when the clutch elements are so operatively connected, constrains its associated members to co-rotation, and said other members are rotatable relative to the body and are connected to the common drive means and are rotatably driven thereby.

6. The device according to claim 5 wherein the other clutch element is movably mounted in the body and, when the clutch elements are so operatively connected, restrains its associated members from co-rotation, and said other members are rotatable relative to the body and are connected to the common drive means and are rotatably driven thereby.

7. A device according to claim 3 wherein said self releasing means includes a longitudinal shoulder on said one member, a spring seated detent movable radially of the common axis into and out of engagement with the shoulder, cam means on the shoulder and detent to cam the detent out of engagement with the shoulder in response to said predetermined maximum reaction force.

8. The device according to claim 3 wherein each self releasing clutch means is normally operatively connected to said one of its associated members to render said common driving means effective to cause said relative rotation for driving the fingers in the retracting direction, and including means rendered operable by the movement of the associated finger to a retracted position to release the self-releasing means from said one of its associated members.

9. The support according to claim 3 wherein each finger supporting means supports its associated finger for movement along said common axis, each device includes a screw element and a complementary follower element, said elements being connected to the relatively rotatable members, respectively, for extending and retracting their associated finger upon said relative rotation in opposite directions.

10. The device according to claim 3 wherein each self releasing clutch means includes a rocker carried on said other of the members for rocking about an axis parallel to said common axis of the members, a detent on one end of the rocker, a spring interposed between the other end of the rocker and said other member and urging the rocker in a direction to swing the detent toward said axis, said one member having an outwardly opening groove extending parallel to said common axis and receiving said detent for movement concurrently therealong and circumferentially of said common axis therewith.

11. The device according to claim 3 wherein one of the members is a sleeve rotatable in, and relative to, the body, and is rotatably driven by the common drive means for advancing and retracting the finger when the sleeve is rotated relative to the other member, the self releasing means is mounted in the body and restrains rotation of said other member relative to the body when in operative engagement with said other member, thereby to effect the relative rotation of said other member.

12. A pipe wall support unit for a pipe wall support which includes a body and a plurality of fingers mounted in the body with their axes extending generally radially of the body for movement radially of the body, said unit comprising a sleeve member adapted to be secured in the body with its axis extending radially of the body, said sleeve member having an axial bore, a finger mounted in the bore for axial movement therealong, a finger driving member carried by and coaxial with the sleeve, a screw and follower connection between the members for moving the finger axially in opposite directions by the finger driving member upon relative rotation of the members, means on one of the members adapted for rotational driving engagement with a rotatable driving means in the body when the unit is installed, a slip connection operatively connected to one of the members and operative, when so connected, to render the rotatable driving means effective to cause relative rotation of the members for moving the finger axially in said bore, and said slip connection being releasable by a predetermined reaction moment imposed on it by the finger to discontinue the operative connection.

13. A unit for the purposes described and comprising a sleeve member having a central bore, a finger mounted in the bore for movement axially thereof, a member for driving the finger, said member being mounted in the bore for movement axially thereof and for rotation relative thereto, a screw and follower connection between the members for moving the members in opposite directions axially of the sleeve member upon relative rotation of the members in opposite directions circumferentially, means for connecting the sleeve member in the body, means in the body adapted for connection to one of the members for causing rotation of said one of the members relative to the other for moving the finger member in the advancing and retracting direction, and said means including a slip connection operative to release from the member to which it is connected to discontinue relative rotation consequent upon a predetermined reaction moment being imposed on said connection by the resistance to rotation relative to the body of said one member.

14. A pipe wall support comprising a body adapted to be disposed endwise in coaxial telescopic radially spaced relation to the peripheral wall of a pipe, a plurality of pipe engaging fingers, supporting means respective to the fingers and supporting them in the body for movement transversely relative to the body axis in an extending pipe engaging direction and in an opposite retracting direction, selectively, extending and retracting means for the fingers, respectively, each extending and retracting means being rotatable in opposite directions for driving its associated finger in said extending and retracting directions, respectively, a common rotatable reversible driving means mounted in the body, self releasing clutch means for the fingers, respectively, each self releasing clutch means being normally operatively connected to its associated extending and retracting means to render the common driving means effective to cause said rotation of the associated finger extending and retracting means, and each self releasing clutch means being operative in response to a predetermined maximum reaction moment imposed on it by its associated finger extending and retracting means, when the common driving means is driving the fingers in the extending direction, to release itself from its associated finger extending and retracting means thereby to cause discontinuance of said rotation thereof.

References Cited in the file of this patent
UNITED STATES PATENTS

| | | |
|---|---|---|
| 610,401 | Hoffmann | Sept. 6, 1898 |
| 1,885,613 | Littell | Nov. 1, 1932 |
| 2,321,146 | Jones | June 8, 1943 |